United States Patent
Lai et al.

(10) Patent No.: US 7,440,008 B2
(45) Date of Patent: Oct. 21, 2008

(54) VIDEO STABILIZATION METHOD

(75) Inventors: Shang-Hong Lai, Hsinchu (TW); Hong-Chang Chang, Taipei (TW); Kuang-Rong Lu, Taipei (TW)

(73) Assignee: Corel TW Corp., Taipei (TW)

( * ) Notice: Subject to any disclaimer, the term of this patent is extended or adjusted under 35 U.S.C. 154(b) by 742 days.

(21) Appl. No.: 10/866,875

(22) Filed: Jun. 15, 2004

(65) Prior Publication Data
US 2005/0275727 A1 Dec. 15, 2005

(51) Int. Cl.
*H04N 5/228* (2006.01)
(52) U.S. Cl. ................................. 348/208.99
(58) Field of Classification Search ............. 348/208.99
See application file for complete search history.

(56) References Cited

U.S. PATENT DOCUMENTS 5,883,983 A * 3/1999 Lee et al. .................... 382/268
2004/0071215 A1* 4/2004 Bellers .................. 375/240.16

OTHER PUBLICATIONS

P. Sobey, M.V. Srinivasan, "Measurement of optical flow by a generalized gradient scheme", Sep. 1991, Optical Society of America, vol. 8 No. 9, p. 1491.*

Chen, Ting. "Video stabilization algorithm using a block-based parametric motion model". EE392J Project Report, Winter 2000, Stanford University, CA, pp. 1-32.

Litvin, Andrew et al. "Probabilistic video stabilization using Kalman filtering and mosaicking". IS&T/SPIE Symposium on Electronic Imaging, Image and Video Communications and Proc., Jan. 20-24, 2003, Sanata Clara, CA.

Morimoto, Carlos et al. "Automatic digital image stabilization". Computer Vision Laboratory, Center for Automation Research, University of Maryland, College Park, MD.

* cited by examiner

*Primary Examiner*—Lin Ye
*Assistant Examiner*—Anthony J Daniels
(74) *Attorney, Agent, or Firm*—Birch, Stewart, Kolasch & Birch, LLP.

(57) ABSTRACT

A video stabilization method. First, optical flows between successive frames are calculated. The camera motion is then estimated by fitting the computed optical flow field to a simplified affine motion model with a trimmed least square method. Then, the computed camera motions are smoothed to reduce the motion vibrations by using a regularization method. Finally, all frames of the video are transformed based on the original and smoothed motions to obtain a stabilized video.

18 Claims, 8 Drawing Sheets

VIDEO STABILIZATION METHOD

BACKGROUND OF THE INVENTION

1. Field of the Invention

The present invention relates to video processing and particularly to a video stabilization method.

2. Description of the Related Art

The acquisition of digital video usually suffers from undesirable camera jitters due to unstable random camera motions, which are produced by a hand-held camera or a camera in a vehicle moving on a non-smooth road or terrain.

In the past decade, demand for video stabilization has capable of eliminating video motion vibrations, common in non-professional home videos, has increased greatly. A number of methods have been proposed to reduce irregular motion perturbations in video. Morimoto and Chellappa, in "Automatic digital image stabilization," IEEE Intern. Conf. on Pattern Recognition, pp. 660-665, 1997, proposed use of a 2D rigid motion model in combination with a pyramid structure to compute motion vectors with sub-pixel accuracy. Then a global motion model is used as an affine motion model to represent rotational and translational camera motions.

Chen, in "Video stabilization algorithm using a block-based parametric motion model", EE392J Project Report, Winter 2000, used a block-based motion estimation in conjunction with an affine motion model to compute the camera motion model from consecutive frames, followed by smoothing the sets of affine motion parameters along a timeline. Additionally, Litvin et al., in "Probabilistic video stabilization using Kalman filtering and mosaicking," In IS&T/SPIE Symposium on Electronic Imaging, Image and Video Communications and Proc., Jan. 20-24, 2003, employed a probabilistic model for camera motion and applied the Kalman filter to reduce motion noise and obtain stabilized camera motion.

However, conventional methods are not robust and efficient, and lack consideration of regularization between undefined regions and motion smoothness. Therefore, the present invention provides a real-time robust video stabilization method to remove undesirable jitter motions and produce a stabilized video.

SUMMARY OF THE INVENTION

It is therefore an object of the present invention to provide a video stabilization method that regularizes undefined regions and motion smoothness of a desired stabilized video.

Another object of the present invention is to provide a video stabilization method that filters optical flow vectors corresponding to object motions.

Still another object of the present invention is to provide a video stabilization method that refines optical flow vectors in a recursive manner.

To achieve the above objects, the present invention provides a video stabilization method. According to one embodiment of the invention, first, optical flow vectors between original frames of a video are calculated. A regularization parameter is then employed to compromise the number of undefined regions and degree of motion smoothness of a desired stabilized video corresponding to the video according to the optical flow vectors. Then, smoothed optical flow vectors are calculated according to the regularization parameter and the optical flow vectors. Thereafter, the stabilized video is generated according to the original frames, the optical flow vectors, and the smoothed optical flow vectors.

The percentage of pixels in each desired stabilized frame without reference to the corresponding original frame is further calculated, and the regularization parameter is adjusted and the percentage calculation is repeated accordingly until the percentage is not greater than a predetermined threshold.

Scaling and rotation parameters and translation parameters are further calculated according to the optical flow vectors. A fitting error for each data point corresponding to a respective optical flow vector is calculated according to the scaling and rotation parameters and the translation parameters, and an error standard deviation is calculated according to the fitting errors of all data points. The optical flow vector is discarded from the global motion estimation if the corresponding fitting error is greater than a threshold determined by the error standard deviation.

A block for each data point in the original frames is further checked, and the data point is skipped in optical flow vector calculation if the block is a homogeneous region.

The optical flow vectors are further repeatedly refined a predetermined number of times at most according to the generated optical flow vectors in a recursive manner or until an absolute difference between the optical flow vectors and the refined optical flow vectors is less than a predetermined threshold.

The above-mentioned method may take the form of program code embodied in tangible media. When the program code is loaded into and executed by a machine, the machine becomes an apparatus for practicing the invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE INVENTION

Before presenting a detailed description, a higher-level description will first be provided with regard to aspects of the invention.

Figure 1:
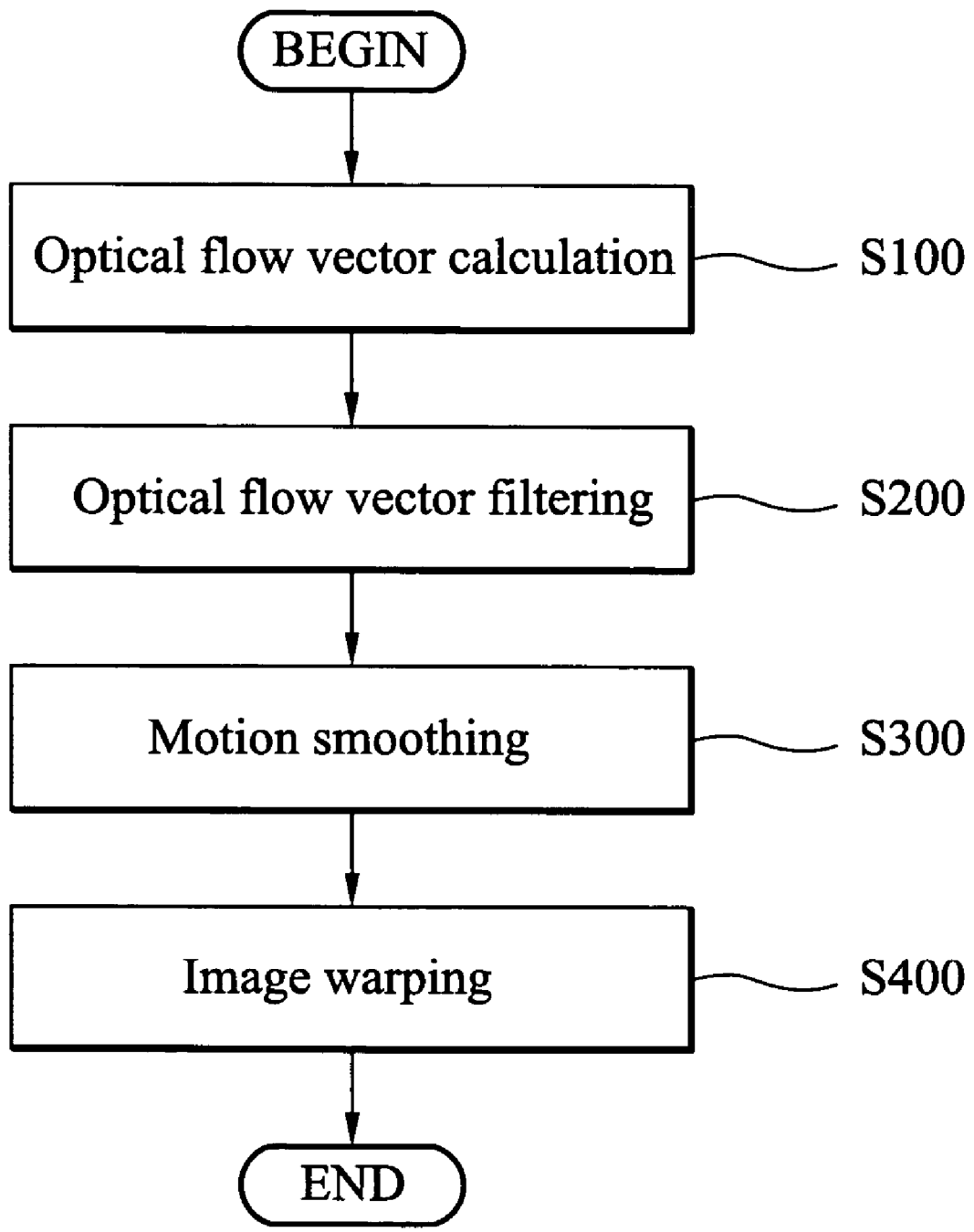
FIG. 1 is a flowchart showing a video stabilization method according to one embodiment of the present invention.

FIG. 1 is a flowchart showing a video stabilization method according to one embodiment of the present invention. First, the optical flow including vectors between consecutive frames is computed based on modification of the Lucas and Kanade's method (S100). Then, the optical flow vectors are filtered (S200). In optical flow vector filtering, camera motion is estimated by fitting a simplified affine motion model to the computed optical flow vectors by using a trimmed least square algorithm. Subsequently, camera motion parameters are smoothed from the computed camera motion in a regularization framework with a smoothness parameter determined recursively from the area percentage of undefined regions after the stabilization (S300). In motion smoothing, a plurality of affine transformation parameters for respective frame of the original video can be calculated according to the smoothness parameter. Since the original and stabilized camera motions are available, every frame of the original video is transformed with an affine transformation with the corresponding affine transformation parameter to produce a stabilized video (S400).

The detailed description of the video stabilization method according to the embodiment of the present invention is provided as follows.

Optical flow is the instantaneous motion vector at each pixel in the image frame at a time instant. This information is fundamental to many video analysis systems including motion segmentation, image mosaic and video stabilization. Many approaches for optical flow computation have been proposed in the past. Among them, the gradient-based approach has been quite popular. The optical flow computation algorithm employed in the embodiment of the present invention belongs to this camp.

For sake of efficiency in optical flow calculation, an image is partitioned into smaller n-by-n non-overlapped blocks. If the block size is not too large, it is assumed that the motion vectors in all pixels in the block are the same and the motion vector at the center is sufficient to approximate the motion of all pixels in the entire block. This assumption was originally used in the Lucas and Kanade's method, in "An Iterative Image Registration Technique with an Application to Stereo Vision," Proc. IJCAI81, pp. 674-679, 1981, for computing optical flow.

Figure 2:
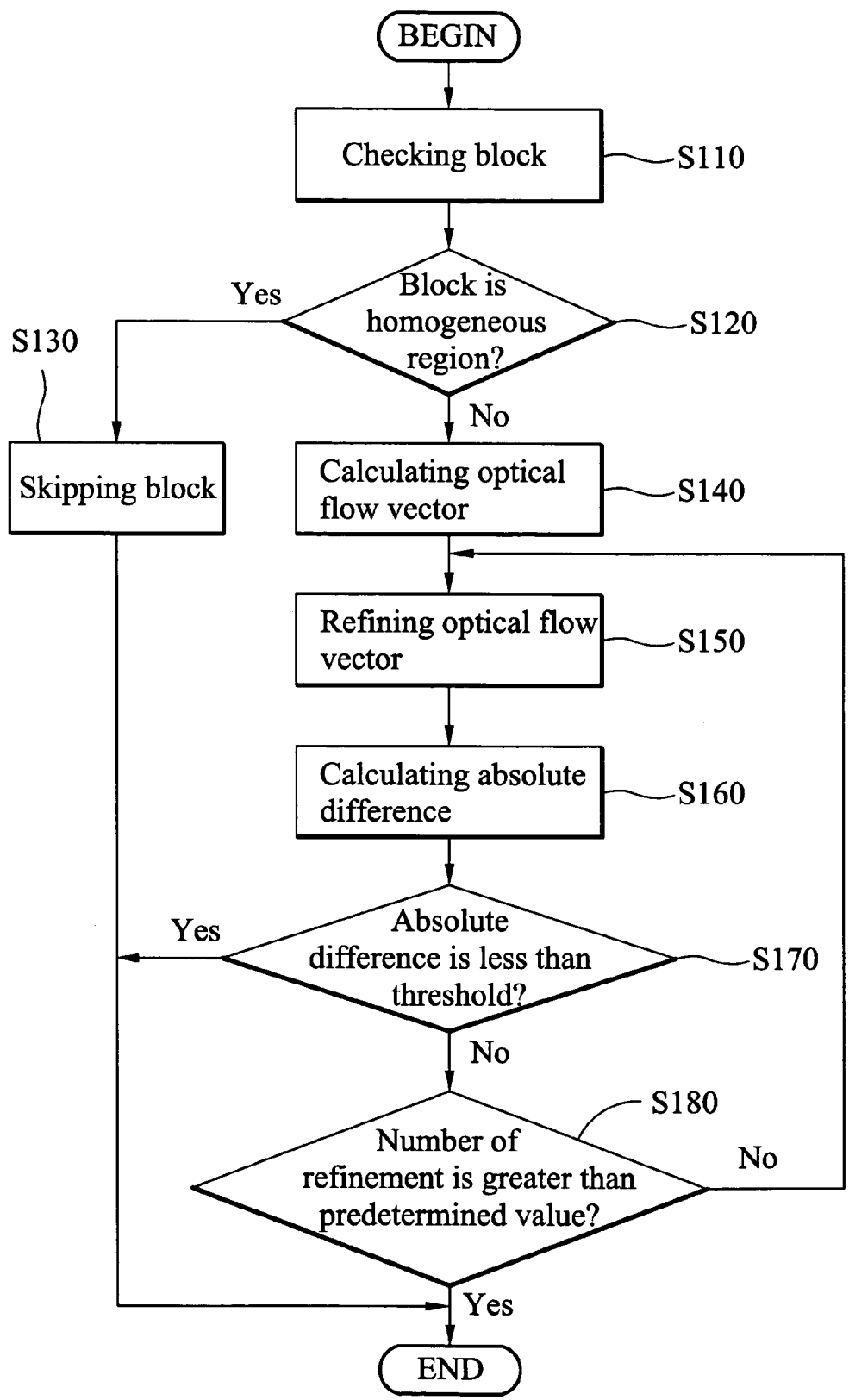
FIG. 2 is a flowchart showing the operation of optical flow vector calculation according to one embodiment of the present invention.

FIG. 2 is a flowchart showing the operation of optical flow vector calculation according to one embodiment of the present invention. Since the Lucas and Kanade's method cannot provide reliable motion estimation in nearly homogeneous regions, each block is first checked (S110) and determined whether it is a homogeneous region (S120). The homogeneous regions can be detected by checking the following condition:

$$\left[\sum\left(\left|\frac{\partial I_0(x, y)}{\partial x}\right| + \left|\frac{\partial I_0(x, y)}{\partial y}\right|\right)\right] < T,$$

where T is a predetermined (user defined) threshold. If the sum of absolute gradients in a block is less than the threshold T, the block is declared a homogeneous region. If the block is a homogeneous region (Yes in step S120), the block is skipped in optical flow vector calculation (S130).

If the block is not a homogeneous region (No in step S120), optical flow vector for the block is calculated (S140). To account for temporal brightness variations, the generalized optical flow constraint under non-uniform illumination is used, instead of the traditional image flow constraint that was derived from the brightness constancy assumption. The generalized optical flow constraint is follows:

$$\frac{\partial I_0(x, y)}{\partial x} u + \frac{\partial I_0(x, y)}{\partial y} v + I_0(x, y)w + I_0(x, y) - I_1(x, y) = 0, \quad (1)$$

where w is a constant used for compensating the intensity variation between two corresponding points at consecutive frames.

Similar to the assumption made in the Lucas and Kanade's method, three unknowns $\hat{u}$, $\hat{v}$, and $\hat{w}$ are constants in a local window. Then, all the generalized optical flow constraints in the local window are combined to estimate the three unknowns with the linear least square method. The least-square estimation is to minimize the following energy function.

$$E(u, v, w) = \sum_{(x,y) \in W_{i,j}} \left(\frac{\partial I_0(x,y)}{\partial x} u + \frac{\partial I_0(x,y)}{\partial y} v + I_0(x,y)w + I_0(x,y) - I_1(x,y)\right)^2, \quad (2)$$

where $w_{i,j}$ is the local neighborhood window centered at the location (i, j). It is understood that the minimization of the above quadratic energy function leads to the least-square solution for the optical flow vector (u, v) and the illumination factor w. The least-square minimization is accomplished by solving an associated linear system.

To alleviate the Taylor approximation error in the above optical flow constraint equation and get more accurate motion vectors, the optical flow vectors are further refined (S150). The present invention provides an iterative least-square optical flow estimation algorithm that refines the generalized optical flow constraints step by step. The iterative refinement process is to move the block in the image with the newly estimated motion vector and compute the updated optical flow constraints in a recursive manner. The updated optical flow constraint is given by:

$$\frac{\partial I_0(x+u^{(k)}, y+v^{(k)})}{\partial x} \Delta u^{(k)} + \frac{\partial I_0(x+u^{(k)}, y+v^{(k)})}{\partial y} \Delta v^{(k)} + \quad (3)$$
$$(1 + w^{(k)}) I_0(x+u^{(k)}, y+v^{(k)}) - I_1(x, y) = 0.$$

Thus, the residual optical flow vector $(\Delta u^{(k)}, \Delta v^{(k)})$, and the illumination factor $w^{(k)}$ are computed by the above least-square estimation procedure with the above updated optical flow constraint. It is understood that an absolute difference between the optical flow vector and the refined optical flow vector is calculated (S160). The recursive refinement is complete until the absolute difference is less than a predetermined threshold (Yes in step S170) or if the number of refinements is greater than a predetermined value (Yes in step S180).

After the motion vectors are generated, the camera motion is estimated from the motion vectors. Considering complexity and accuracy, a simplified affine motion model for the camera motion is used since it can handle scaling, rotation and translation all together. Then, the trimmed least square algorithm is used to robustly fit the simplified affine motion from the computed motion vectors by discarding the outlier of the motion vectors. In the present invention, the most dominant motion in every frame is the camera motion.

Figure 3:
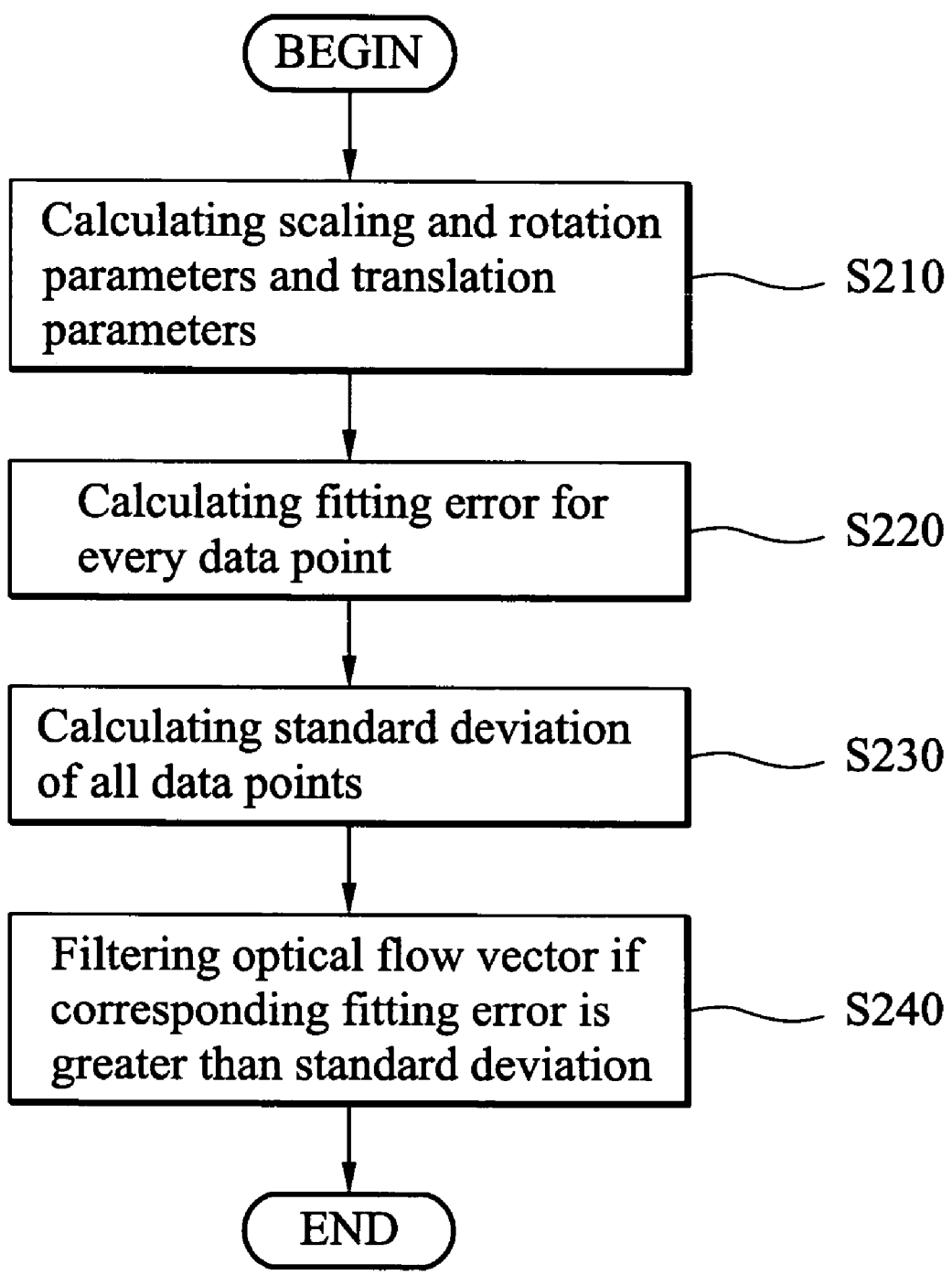
FIG. 3 is a flowchart showing the operation of optical flow vector filtering according to one embodiment of the present invention.

FIG. 3 is a flowchart showing the operation of optical flow vector filtering according to one embodiment of the present invention. The simplified affine motion model is modeled by four parameters, i.e. (a, b, c, d), and it can be written as:

$$\begin{bmatrix} x' \\ y' \end{bmatrix} = \begin{bmatrix} a & -b \\ b & a \end{bmatrix} \begin{bmatrix} x \\ y \end{bmatrix} + \begin{bmatrix} c \\ d \end{bmatrix}, \quad (4)$$

where parameters a and b control the scaling and rotation, and parameters c and d correspond to the translation. N motion vectors with corresponding image position $(x_i, y_i)$ and $(x'_i, y'_i)$ for i=1, 2, ..., N in adjacent frames are provided. First, the simplified affine motion between the two frames from the N motion vectors by solving the following over-constrained linear system (S210).

$$\begin{pmatrix} x_1 & -y_1 & 1 & 0 \\ \vdots & \vdots & \vdots & \vdots \\ x_n & -y_n & 1 & 0 \\ y_1 & x_1 & 0 & 1 \\ \vdots & \vdots & \vdots & \vdots \\ y_n & x_n & 0 & 1 \end{pmatrix} \begin{pmatrix} a \\ b \\ c \\ d \end{pmatrix} = \begin{pmatrix} x_1 + u_1 \\ \vdots \\ x_n + u_n \\ y_1 + v_1 \\ \vdots \\ y_n + v_n \end{pmatrix}. \quad (5)$$

It is understood that the traditional least-square solution of the above over-constrained system is sensitive to outliers. It is also understood that the computed optical flow vectors result from camera motion and object motions. To discard the less dominant object motions from the fitting of the simplified affine motion, a trimmed least square method is employed to achieve robust camera motion estimation. In the trimmed least square algorithm, the least square estimation is first applied and fitting errors $U'_n = ax_n - by_n + c - x'_n$, $V'_n = ay_n - bx_n + d - y'_n$ are calculated for every data point (S220). By collecting the error statistics from all the data points, an error standard deviation is calculated (S230), and the estimated error standard deviation is used to identify and filter the data points with large errors as the outlier and discard them from the data set for model fitting (S240). Then, the least square fitting of the simplified affine motion model is repeated with the trimmed data point set and the outliers with updated motion parameters are rejected. This process is repeated until no new outlier is identified. Thus, the final converged motion parameters accurately represent the camera motion.

Figure 4A:
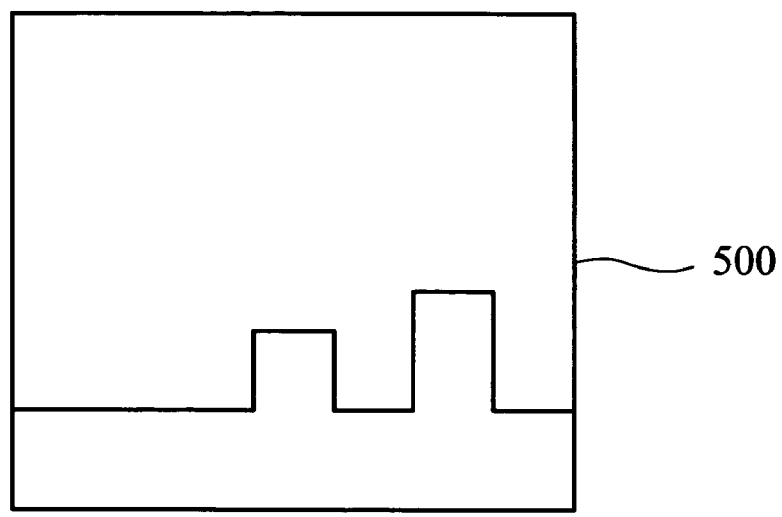
FIG. 4A shows an original frame.
Figure 4B:
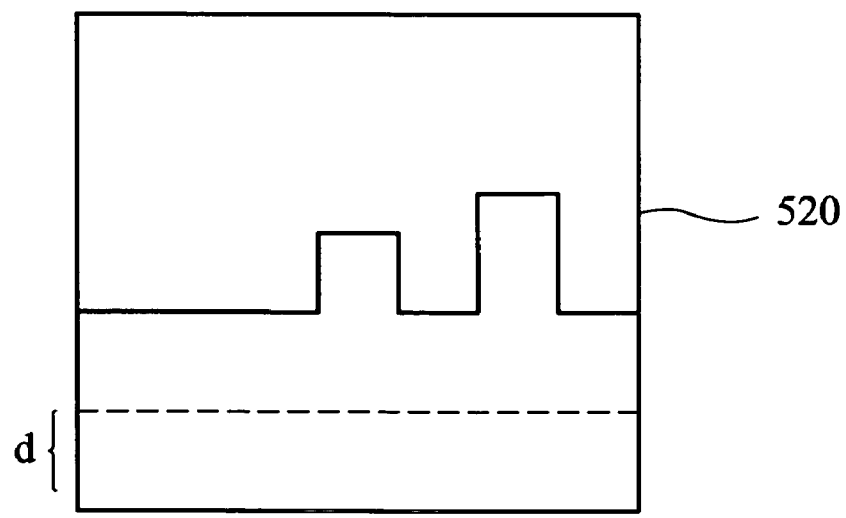
FIG. 4B shows a frame with camera jitters corresponding to the original frame in FIG. 4A.
Figure 4C:
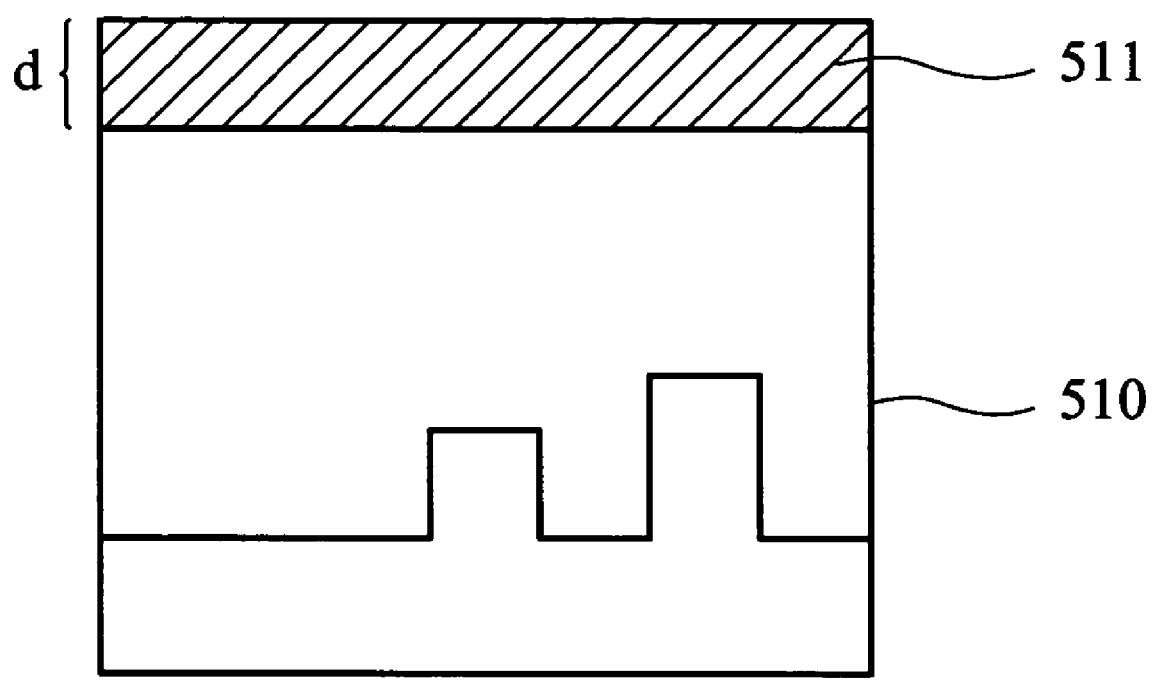
FIG. 4C shows a stabilized frame with an undefined region corresponding to the frame in FIG. 4B.

To alleviate the visual disruption caused by camera motion perturbations, the motion smoothing step is required to temporally smooth out the camera motions for the whole video. To achieve this goal, two issues are considered. The first issue is the undefined region problem. For example, FIG. 4A shows an original frame 500, and FIG. 4B shows a frame 520 with camera jitters corresponding to the original frame 500 in FIG. 4A. In FIG. 4B, the frame 520 is shifted upward by d in vertical. In stabilization, the frame 520 requires to be shifted downward by d, and a stabilized frame 510 with an undefined region 511 is shown in FIG. 4C. The undefined region 511 is generated since no data source is provided from the frame 520. To reduce the amount of undefined regions in the stabilized video, the difference between the accumulated original simplified affine motion parameters f and the accumulated smoothed affine motion parameters $\bar{f}$ cannot be too large. The second issue regards production of a smooth video sequence. The temporal variations of the smoothed affine motion parameters cannot be too large. A tradeoff usually exists between the amount of undefined regions and the degree of motion smoothness. Therefore, a regularization framework for temporal smoothing is provided. In the regularization, a regularization parameter λ directly determines the degree of motion smoothness. If λ is larger, the stabilized video will have very smooth camera motion, but the total amount of undefined regions will also be larger. Therefore, it is important to select an appropriate value for λ.

Figure 5:
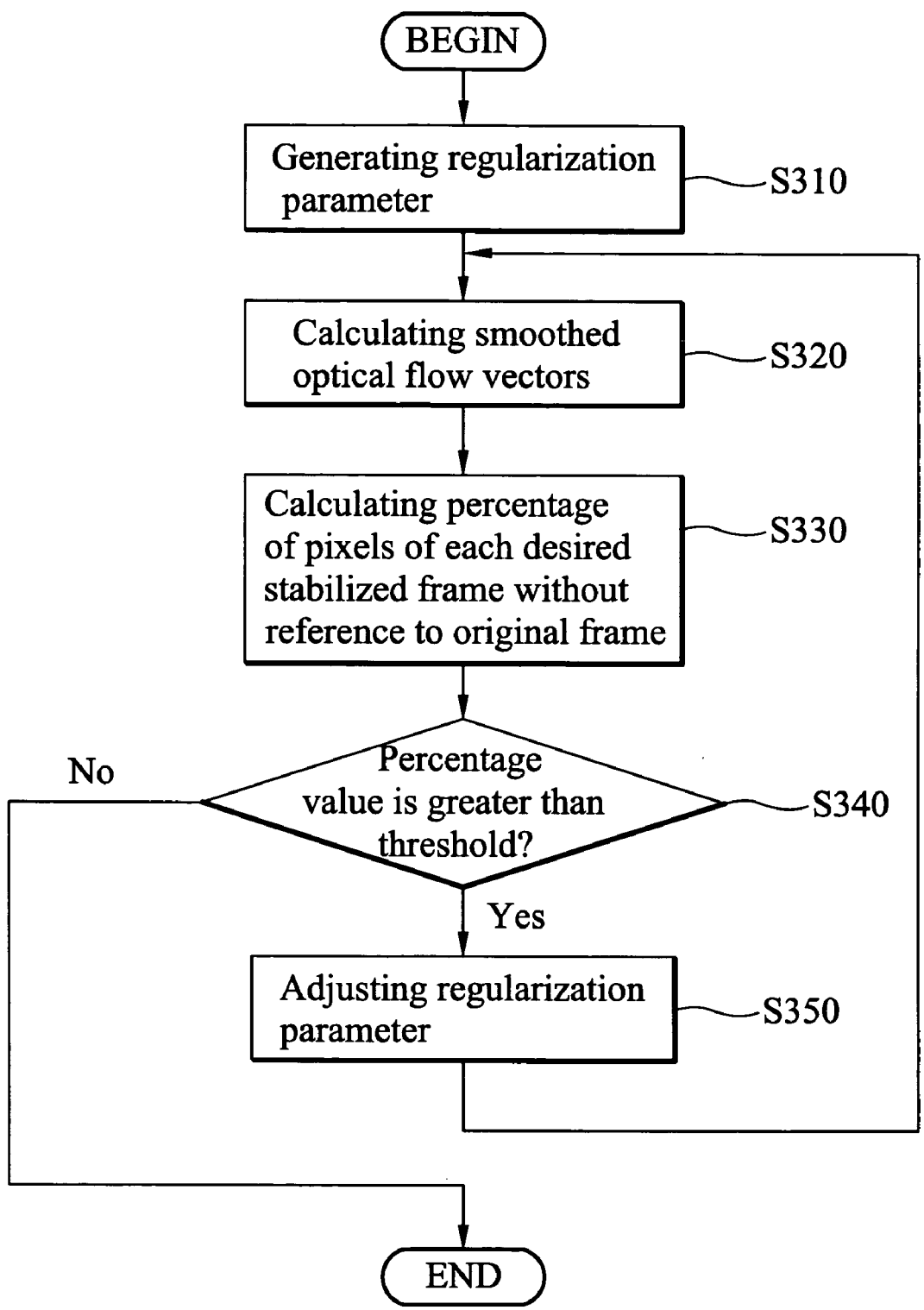
FIG. 5 is a flowchart showing the operation of motion smoothing according to one embodiment of the present invention.

FIG. 5 is a flowchart showing the operation of motion smoothing according to one embodiment of the present invention. The regularization approach for motion smoothing involves minimizing a cost function that consists of two parts. The first part of the cost function is the penalty of data deviations, which can be written as:

$$P = \sum_{i=1}^{n} (f_i - \bar{f}_i)^2.$$

The second part of the cost function corresponds to the temporal motion smoothness constraint, which can be written as:

$$Q = \sum_{i=2}^{n} (\bar{f}_i - \bar{f}_{i-1})^2.$$

Thus, the total cost function is written as:

$$E = P + \lambda Q \quad (6),$$

where $f_i = (a_i, b_i, c_i, d_i)$, and $\bar{f}_i = (a'_i, b'_i, c'_i, d'_i)$ is the numbers of simplified affine motion parameters.

First, a value for the regularization parameter λ is set (S310). Since the unknowns are the $\bar{f}_i$ parameter vectors, the minimization of the cost function requires solution of the following linear system:

$$\begin{bmatrix} \lambda+1 & -\lambda & 0 & \cdots & 0 \\ -\lambda & 2\lambda+1 & -\lambda & \ddots & \vdots \\ 0 & \ddots & \ddots & \ddots & 0 \\ \vdots & \ddots & -\lambda & 2\lambda+1 & -\lambda \\ 0 & \cdots & 0 & -\lambda & \lambda+1 \end{bmatrix} \begin{bmatrix} \bar{f}_1 \\ \bar{f}_2 \\ \vdots \\ \vdots \\ \bar{f}_n \end{bmatrix} = \begin{bmatrix} f_1 \\ f_2 \\ \vdots \\ \vdots \\ f_n \end{bmatrix}. \quad (7)$$

After solving the linear system by LU decomposition, all the smoothed affine motion parameters can be obtained (S320). Then, the relationship between the original and the stabilized videos can be obtained.

Therefore, the percentage of the pixels without reference to the frames in the original video is calculated (S330), and the percentage values P are compared to a predetermined threshold T (S340). If any of the stabilized frames have a percentage value P larger than the predetermined threshold T (Yes in step S340), the regularization parameter λ is adjusted, for example, by reducing λ by half, and the motion smoothing (steps S320-S350) are repeated until all the percentage values P are less than the predetermined threshold T (No in step S340).

Figure 6:
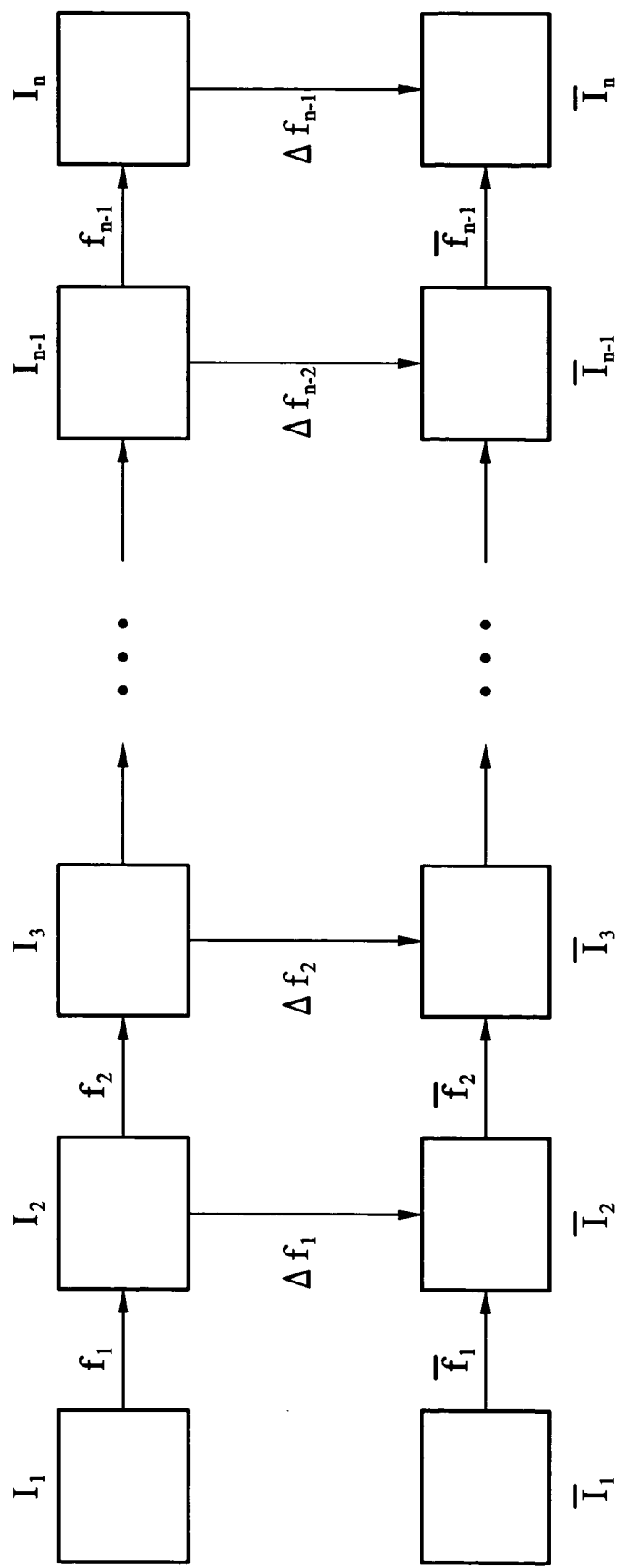
FIG. 6 is a schematic diagram illustrating the relationship between original and stabilized frames.

FIG. 6 is a schematic diagram illustrating the relationship between original and stabilized frames. In FIG. 6, $I_1, I_2, \ldots I_n$ represent the original images in the video, and $\bar{I}_1, \bar{I}_2, \ldots, \bar{I}_n$ represent the corresponding stabilized frames. The stabilized output frame can be obtained by warping the corresponding original frame. The affine transformation associated with the simplified affine parameter vector $f_i$ can be written as:

$$A(f_i) = \begin{bmatrix} -b_i & a_i & d_i \\ a_i & b_i & c_i \\ 0 & 0 & 1 \end{bmatrix}, \quad (8)$$

and the relationship between successive frames can be written as follows:

$$I_n(x', y') = I_{n-1}(A(f_{i-1})(x, y, 1)^T) \quad (9).$$

The relationship between the original input frame $I_k$ and corresponding output frame $\bar{I}_k$ can be derived from the following:

$$\prod_{i=1}^{k} A(f_i) \cdot A(\Delta f_k) = \prod_{i=1}^{k} A(\bar{f}_i) A(\Delta f_k) = \left( \prod_{i=1}^{k} A(f_i) \right)^{-1} \prod_{i=1}^{k} A(\bar{f}_i). \quad (10)$$

In the image warping of the stabilized frames, the affine transformation is applied with the affine parameters $\Delta f$ determined above to the original frame to produce the stabilized frame. The backward projection scheme is employed with the nearest-neighbor interpolation for the image warping. The result is not much different from that of the bilinear interpolation but the execution time is much less than the bilinear interpolation.

Figure 7:
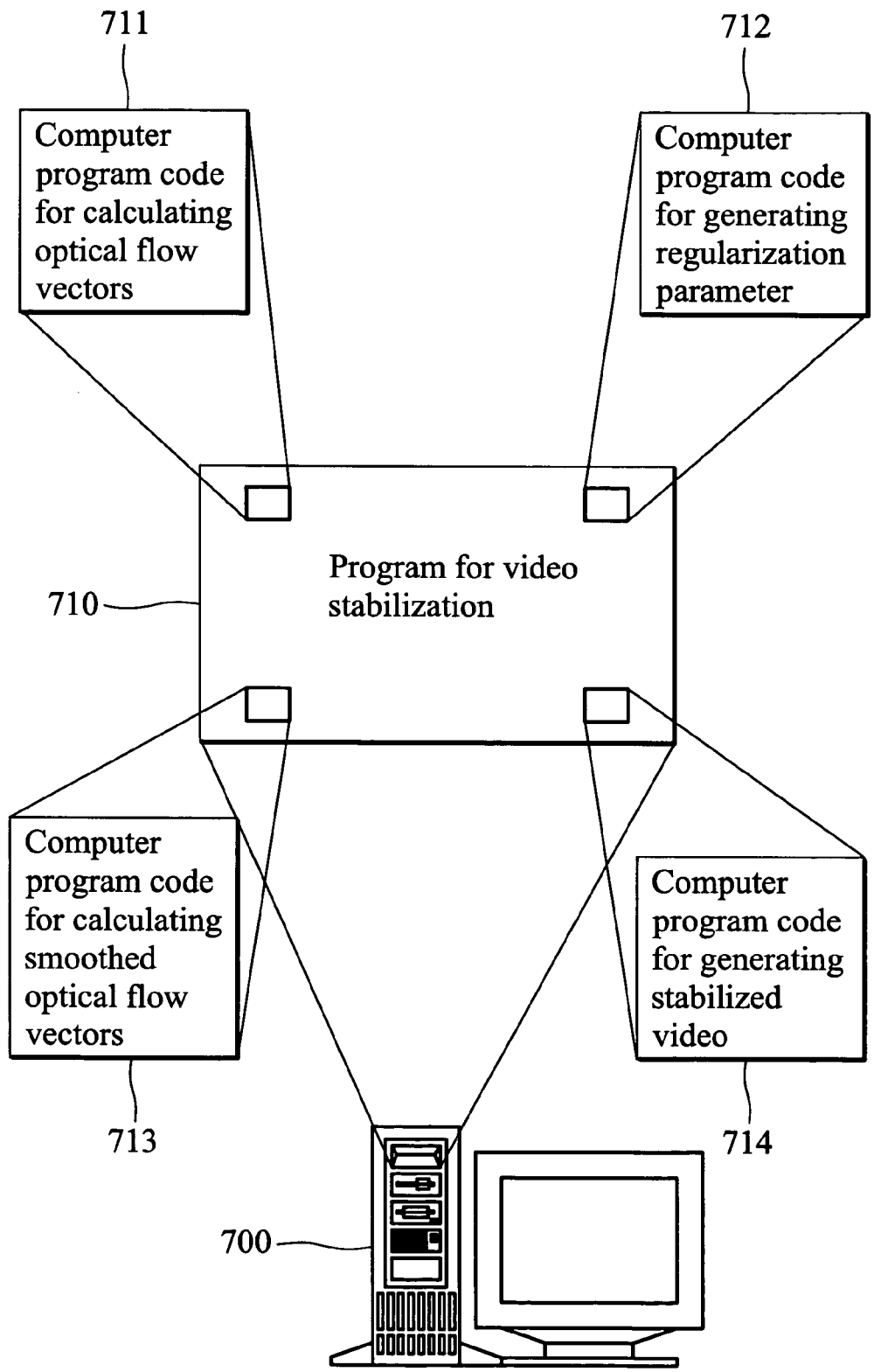
FIG. 7 is a schematic diagram illustrating a storage medium for storing a computer program for execution of the video stabilization method according to one embodiment of the present invention.

FIG. 7 is a diagram of a storage medium for storing a computer program providing the video stabilization method according to the present invention. The computer program product comprises a storage medium 710 having computer readable program code embodied in the medium for use in a computer system 700, the computer readable program code comprises at least computer readable program code 711 calculating optical flow vectors between original frames of a video, computer readable program code 712 generating a regularization parameter to regularize the number of undefined regions and the degree of motion smoothness of a desired stabilized video corresponding to the video according to the optical flow vectors, computer readable program code 713 calculating smoothed optical flow vectors according to the regularization parameter and the optical flow vectors, and computer readable program code 714 generating the stabilized video according to the original frames, the optical flow vectors, and the smoothed optical flow vectors.

The computer readable program code further comprises computer readable program code filtering the optical flow vectors corresponding to object motions. The computer readable program code further comprises computer readable program code skipping the data point in optical flow vector calculation if the block is a homogeneous region. The computer readable program code further comprises computer readable program code refining the optical flow vectors according to the generated optical flow vectors in a recursive manner.

The present invention thus provides a real-time, robust, and efficient video stabilization method that regularizes undefined regions and motion smoothness of a desired stabilized video, filters optical flow vectors corresponding to object motions, and refines optical flow vectors in a recursive manner, thereby removing undesirable jitter motions and producing a stabilized video.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. For example, the method and system of the present invention may be stored in a remote device or storage medium, and transmitted to another device or storage medium for execution or storage via a network. When implemented on a general-purpose processor, the program code combines with the processor to provide a unique apparatus that operates analogously to application specific logic circuits.

What is claimed is:

1. A video stabilization method, comprising the steps of:
   calculating optical flow vectors between original frames of a video;
   generating a regularization parameter to regularize undefined regions and the degree of motion smoothness of a desired stabilized video corresponding to the video according to the optical flow vectors, and adjusting the regularization parameter, enabling a percentage of the undefined regions in each desired stabilized frame to not be greater than a specific ratio, wherein data values of pixels in the undefined regions are not provided from the original frames;
   calculating smoothed optical flow vectors according to the regularization parameter and the optical flow vectors; and
   generating the stabilized video according to the original frames, the optical flow vectors, and the smoothed optical flow vectors.

2. The method of claim 1, wherein the adjustment of the parameter comprises the steps of:
   calculating percentage of pixels having a certain trait in each desired stabilized frame, in which data values of the pixels having the certain trait are not provided from the corresponding original frame, and the desired stabilized frame is obtained according to the smoothed optical flow vectors; and
   adjusting the regularization parameter and repeating calculation of the percentage accordingly until the percentage is not greater than a predetermined threshold.

3. The method of claim 1, further comprising filtering the optical flow vectors corresponding to object motions.

4. The method of claim 3, wherein filtering of the optical flow vectors further comprises the steps of:
   calculating scaling and rotation parameters and translation parameters according to the optical flow vectors;
   calculating a fitting error for each data point corresponding to respective optical flow vector according to the scaling and rotation parameters and the translation parameters;
   calculating an error standard deviation according to the fitting errors of all data points; and filtering the optical flow vector if the corresponding fitting error is greater than a threshold determined by the error standard deviation.

5. The method of claim 1, further comprising the steps of:
checking a block for each data point in the original frames; and
skipping the data point in optical flow vector calculation if the block is a homogeneous region.

6. The method of claim 5, wherein the block is determined as homogeneous region by determining whether the sum of absolute gradients in the block is less than a predetermined threshold.

7. The method of claim 1, further comprising refining the optical flow vectors according to the generated optical flow vectors in a recursive manner.

8. The method of claim 7, wherein the refinement of the optical flow vectors is performed until an absolute difference between the optical flow vectors and the refined optical flow vectors is less than a predetermined threshold.

9. The method of claim 7, wherein the refinement of the optical flow vectors is repeatedly performed a predetermined number of times.

10. A machine-readable storage medium storing a computer program which, when executed, causes a computer to perform a video stabilization method, the method comprising the steps of:
calculating optical flow vectors between original frames of a video;
generating a regularization parameter to regularize undefined regions and the degree of motion smoothness of a desired stabilized video corresponding to the video according to the optical flow vectors, and adjusting the regularization parameter, enabling a percentage of the undefined regions in each desired stabilized frame to riot be greater than a specific ratio, wherein data values of pixels in the undefined regions are not provided from the original frames;
calculating smoothed optical flow vectors according to the regularization parameter and the optical flow vectors; and
generating the stabilized video according to the original frames, the optical flow vectors, and the smoothed optical flow vectors.

11. The storage medium of claim 10 wherein the adjustment of the regularization parameter comprises the steps of:
calculating percentage of pixels having a certain trait in each desired stabilized frame, in which data values of the pixels having the certain trait are not provided from the corresponding original frame, and the desired stabilized frame is obtained according to the smoothed optical flow vectors; and
adjusting the regularization parameter and repeating calculation of the percentage accordingly until the percentage is not greater than a predetermined threshold.

12. The storage medium of claim 10, wherein the method further comprises filtering the optical flow vectors corresponding to object motions.

13. The storage medium of claim 12, wherein filtering of the optical flow vectors further comprises the steps of:
calculating scaling and rotation parameters and translation parameters according to the optical flow vectors;
calculating a fitting error for each data point corresponding to respective optical flow vector according to the scaling and rotation parameters and the translation parameters;
calculating an error standard deviation according to the fitting errors of all data points; and
filtering the optical flow vector if the corresponding fitting error is greater than a threshold determined by the error standard deviation.

14. The storage medium of claim 10, wherein the method further comprises the steps of:
checking a block for each data point in the original frames; and
skipping the data point in optical flow vector calculation if the block is a homogeneous region.

15. The storage medium of claim 14, wherein the block is determined as a homogeneous region by determining whether the sum of absolute gradients in the block is less than a predetermined threshold.

16. The storage medium of claim 10, wherein the method further comprises refining the optical flow vectors according to the generated optical flow vectors in a recursive manner.

17. The storage medium of claim 16, wherein the refinement of the optical flow vectors is performed until an absolute difference between the optical flow vectors and the refined optical flow vectors is less than a predetermined threshold.

18. The storage medium of claim 16, wherein the refinement of the optical flow vectors is repeatedly performed a predetermined number of times.

* * * * *